United States Patent Office 3,066,168
Patented Nov. 27, 1962

3,066,168
PROCESS FOR THE PRODUCTION OF MONOMETHYLAMINE NITRATE
Leonard A. Stengel, Terre Haute, Ind., assignor to Commercial Solvents Corporation, New York, N.Y., a corporation of Maryland
No Drawing. Filed Dec. 19, 1958, Ser. No. 781,439
1 Claim. (Cl. 260—583)

My invention relates to a one-step process for the production of monomethylamine nitrate and more particularly to a single-step process for the preparation of substantially anhydrous monomethylamine nitrate from monomethylamine and nitric acid solutions.

Previously, monomethylamine nitrate has been prepared by involved and expensive processes which, moreover, are quite hazardous. These processes generally comprise a neutralizing step to produce a monomethylamine nitrate solution, followed by an evaporation step to remove sufficient water so that crystallization, graining, or the like can be accomplished. Most of the processes also involve a final drying step in order to reduce the moisture content of the monomethylamine nitrate to a few tenths of a percent.

These operations are expensive, involving much equipment and the expenditure of large amounts of power and evaporation energy. Usually they are carried out in separate steps in the form of relatively small batches and the operations are scattered over a wide area so as to reduce the hazard from explosions. Because of the tendency of monomethylamine nitrate to explode at or above its melting point, it has not previously been considered possible to prepare it on a commercial scale by the direct interaction of monomethylamine and nitric acid at elevated temperatures.

My new process takes advantage of the large amount of heat produced in the exothermic reaction involving the neutralization of nitric acid by monomethylamine for evaporation of the water present in the system with a minimum of hazard. In addition, I am able to control the water content of the final product and obtain a substantially dry product containing less than about 2.0% moisture.

My process consists essentially of passing a mixture of approximately equimolar proportions of nitric acid and monomethylamine under intimate contact conditions through a reactor tube maintained at a temperature ranging from about 160 to about 250° C.

The nitric acid utilized in my process may contain up to about 80% water, although I prefer to use nitric acid containing less than about 50% water. The monomethylamine may be introduced as a gas, an anhydrous liquid, or in water solution. Generally, I prefer to utilize concentrated aqueous amine solutions or anhydrous monomethylamine.

The amount of water in the monomethylamine and nitric acid determines, to a certain extent, the amount of heat which must be added to or taken from the reaction zone. Where dilute aqueous solutions of monomethylamine and nitric acid are introduced into the reaction zone, additional heat must be provided throughout the reaction period to ensure a dry product. Where concentrated nitric acid and anhydrous monomethylamine are introduced into the reaction zone, the exothermic reaction will provide sufficient heat to vaporize the water in the reaction mixture.

Monomethylamine nitrate decomposes readily at or above its melting point to form a yellow tinted product. However, I am able to produce a high purity, white crystalline product by removing rapidly the reaction products from the reaction zone. The rapidity at which the monomethylamine nitrate is removed from the reaction zone is determined by the temperature of the reaction zone. The reactants should remain in the reaction zone on the order of about 0.1 second when the temperature in the reaction zone is approximately 200° C., or a yellow product will be formed. At about 220° C. a white product is obtained if the reaction time is about 0.04 second. For some unknown reason, it is advantageous to bring the reactants to reaction temperatures almost immediately when they are introduced into the reaction zone. When the desired operating temperature is not reached until the product has passed through a large part of the reactor a yellowed product is again produced.

I prefer to utilize a slight excess of amine in my process and to carry out the reaction in a tubular reactor at temperatures of about 200–220° C.

The tubular reactors utilized in my process are preferably corrosion-resistant to the reactants and to the reaction products and are packed with Raschig rings, glass helices, stainless steel saddles, etc. or baffled with perforated plates, baffle plates, etc., which increase the surface on which the contact can take place. The reactor is preferably placed in a vertical or inclined position so that the monomethylamine nitrate will flow readily out of the lower end of the reactor and the water will flash off as steam.

The reactants may be introduced into the upper end of the reaction independently or through a mixing apparatus. Where the reactants are introduced into the reaction zone independently it is preferred to spray the reactants into the reaction zone in a converging pattern so that maximum mixing will be accomplished in the uppermost end of the reactor.

The lower end of the reactor is preferably equipped with a separatory apparatus in which a hot, dry stripping gas is passed countercurrent to the descending monomethylamine nitrate. Preferably, the temperature of the hot stripping gas should be above the melting point of the monomethylamine nitrate and, in any event, it should be of a temperature which does not result in the solidification of the molten monomethylamine nitrate prior to flowing the monomethylamine nitrate into a mold, a cooling belt, etc. Any gas which is inert to the reactants and to the reaction products at operating temperatures can be used in this apparatus, but air is the preferred stripping gas. If such an apparatus is utilized, monomethylamine having a moisture content less than about 0.5% is obtained readily.

The following examples more completely illustrate my invention, but it is not intended that my invention be limited to the exact materials, proportions, and procedure described, but rather it is intended that all equivalents obvious to those skilled in the art be included within the scope of my invention.

*Example I*

70% $HNO_3$ and monomethylamine vapors in equimolar ratios were mixed and passed down through a 5/8" I.D. x 30" tube, packed with an inert packing. Temperature at inlet of the reactor in the mixing zone was approximately 160° C. The temperature at the bottom of the reactor was maintained in the range of 200–220° C. The products leaving the bottom of the reactor were passed through a separator allowing the molten monomethylamine nitrate to flow from the bottom and the steam out of the top. The molten monomethylamine nitrate after cooling showed a moisture content of about 0.80%.

*Example II*

57% $HNO_3$ was preheated to 100° C. and pumped into the top of an inclined tubular reactor 5/8" I.D. x 30", packed with 6 mm. glass beads. Monomethylamine vapors were mixed with the nitric acid in approximately equimolar ratios and the resulting reaction temperatures were about 140° C. at the top of the reactor and 200° C. at the exit. The products leaving the reactor were passed through a separator and the molten monomethylamine nitrate collected at the bottom. The pressure drop through the reactor was approximately 3 p.s.i.g. and the rates of flow were about 950 gm. of the amine per hour and 1900 gm. of nitric acid (based on 100% nitric acid) per hour. An average of about 6.1 lbs. of monomethylamine nitrate was collected per hour over a period of 10 hours and the moisture averaged about 1%.

*Example III*

The same flow rates and apparatus as in Example II were used except that hot stripping air was passed up through the molten product leaving the bottom of the separator. In this case, the moisture of the collected monomethylamine nitrate was approximately 0.25%.

The following example discloses the effect of high flow rates combined with low reactor temperatures. It is to be noted that a high moisture content product results in such instances. This moisture can be partially removed by stripping the molten monomethylamine but is more easily removed by decreasing the reactant flow rate, increasing reactor temperatures, or by using lower flow rates coupled with higher temperatures.

*Example IV*

57% nitric acid and monomethylamine were preheated to about 100° C. and introduced into the reactor of Example I at about 3 lbs./hr. monomethylamine and about 6 lbs./hr. nitric acid (on a 100% nitric acid basis). The temperature at the top of the reactor was maintained at 170° C. and the temperature around the middle and exit at about 175° C. The pressure drop through the reactor was about 4.5 p.s.i.g. About 9 lbs./hr. monomethylamine nitrate was recovered, containing about 3% $H_2O$.

Now having described my invention what I claim is:

In a process for the production of monomethylamine nitrate by contacting monomethylamine with an aqueous solution of nitric acid having a water concentration not in excess of 80%, the improvement of intimately contacting the nitric acid with the monomethylamine in a tubular reaction zone for a period ranging from about 0.1 to about 0.04 second at a temperature of from about 200 to about 220° C., the said reaction zone having an upper and a lower end, the said monomethylamine and nitric acid being introduced into the upper end of the reactor in approximately equal molar quantities, to form a molten monomethylamine nitrate reaction product which forms a white product upon solidification and a substantially steam reaction product, removing from the lower end of the reaction zone the reaction product in two phases, one of which is substantially steam and the other molten monomethylamine nitrate and recovering the monomethylamine nitrate.

References Cited in the file of this patent
UNITED STATES PATENTS

| | | |
|---|---|---|
| 2,851,484 | Feichtinger et al. | Sept. 9, 1958 |
| 2,933,518 | Frankel et al. | Apr. 19, 1960 |

OTHER REFERENCES

Ann., vol. 76, page 322 (1850).

Degering: "An Outline of Organic Nitrogen Compounds," University Lithoprinters, Ypsilanti, Michigan (1950), p. 301.